(12) United States Patent
Takikawa (10) Patent No.: US 7,730,802 B2
(45) Date of Patent: Jun. 8, 2010

(54) SHIFT LEVER DEVICE FOR VEHICLE

(75) Inventor: Yoshihiro Takikawa, Aichi (JP)

(73) Assignee: Fuji Kiko Co., Ltd. (JP)

( * ) Notice: Subject to any disclaimer, the term of this patent is extended or adjusted under 35 U.S.C. 154(b) by 699 days.

(21) Appl. No.: 11/376,840

(22) Filed: Mar. 16, 2006

(65) Prior Publication Data

US 2006/0213304 A1    Sep. 28, 2006

(30) Foreign Application Priority Data

Mar. 28, 2005   (JP)   ............... P2005-092675

(51) Int. Cl.
*B60K 20/00*   (2006.01)
*B60K 17/04*   (2006.01)
*B60K 17/12*   (2006.01)
*G05G 9/00*    (2006.01)

(52) U.S. Cl. ................. 74/473.1; 74/473.12; 74/473.21

(58) Field of Classification Search ................ 74/473.1, 74/473.12, 473.21; 384/295, 428, 439
See application file for complete search history.

(56) References Cited

U.S. PATENT DOCUMENTS 5,497,673 A    3/1996   Kataumi et al.
5,511,885 A *  4/1996   Coleman ................... 384/439
5,666,855 A *  9/1997   Ebenstein et al. .......... 74/473.3
6,467,965 B1 * 10/2002  Wyer ......................... 384/295

FOREIGN PATENT DOCUMENTS

JP    2584260    8/1998

* cited by examiner

*Primary Examiner*—Thomas R Hannon
*Assistant Examiner*—Justin Krause
(74) *Attorney, Agent, or Firm*—Kilpatrick Stockton LLP

(57) ABSTRACT

A shift lever device includes a shift lever having a pivot shaft formed at a base end of the shift lever integrally and a base having an opening formed to allow the shift lever to be inserted into the base and a pair of bearing parts formed so as to lie on opposing sides of the opening. The pivot shaft extends along a direction intersecting with a longitudinal direction of the shift lever. Each of the bearing parts has a bearing hole formed in the bearing part to adjoin the opening, a guide groove formed in the bearing part to communicate with the bearing hole, for introducing the pivot shaft into the bearing hole and a bearing bush which is to be inserted between the pivot shaft and the bearing hole. The bearing bush has a latch hook provided to engage with an interior of the bearing hole. The bearing bush is fitted to the bearing hole on condition that the pivot shaft is being inserting into the bearing hole through the guide groove, so that the shift lever is rotatably supported by the base through the bearing bush.

4 Claims, 14 Drawing Sheets

SHIFT LEVER DEVICE FOR VEHICLE

BACKGROUND OF THE INVENTION

1. Field of the Invention

The present invention relates to a shift lever device installed in a vehicle.

2. Description of the Related Art

Figure 1:
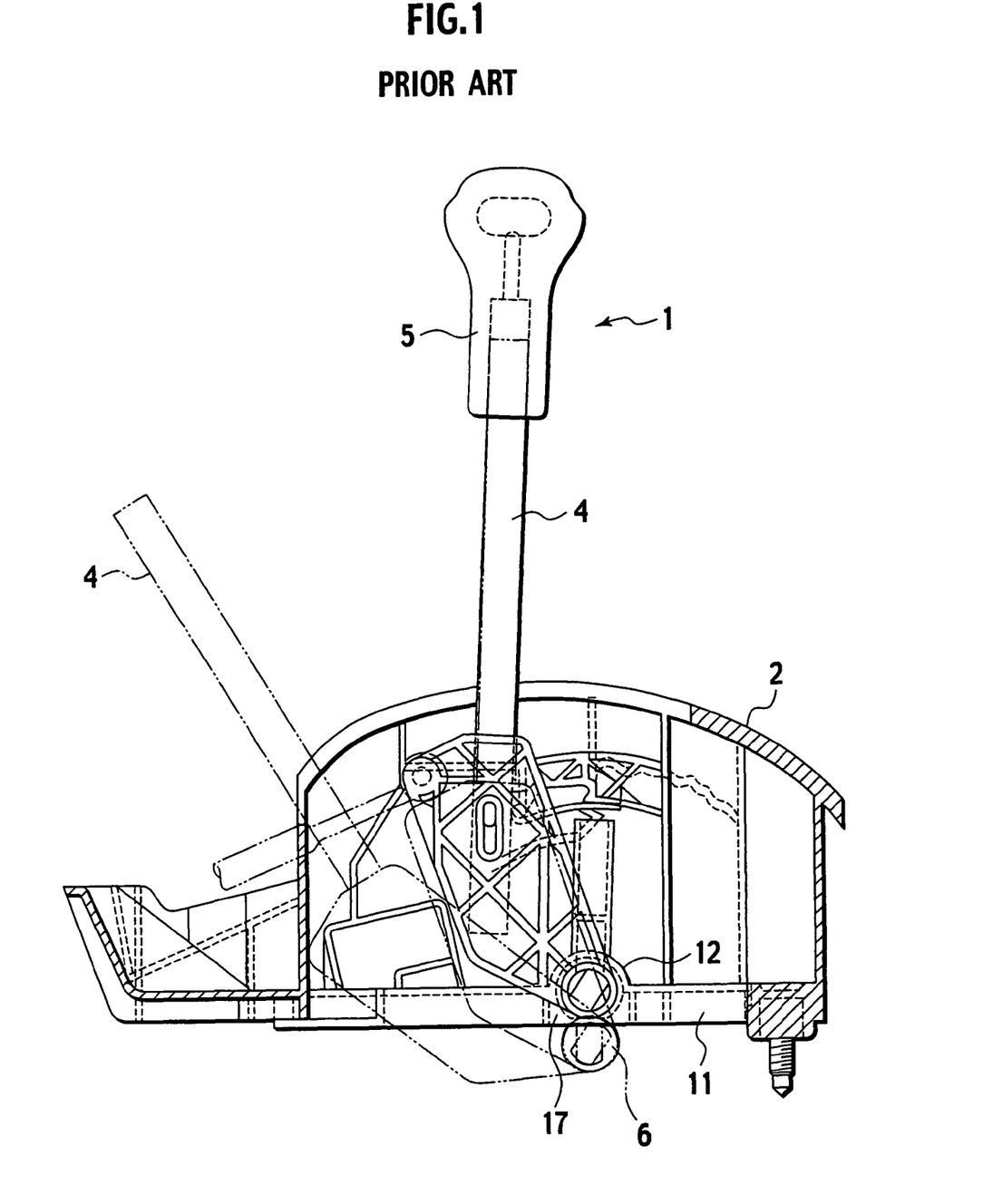
FIG. 1 is a sectional view of a shift lever device in a related art.

As shown in FIG. 1, this kind of shift lever device for an automatic transmission device includes a resinous base 2 fixed on a vehicle body and a shift lever 1 rotatably supported on the base 2 to allow a range position to be changed with a driver's manipulation. The shift lever 1 includes a rod part 4 rotatably supported on the base 2 and a resinous operating part 5 attached to an upper end of the rod part 4. The rod part 4 is formed with a pivot shaft 6. In assembling, since the pivot shaft 6 is inserted into a recessed groove 13 (see FIG. 2) and supported by the base 2, it becomes possible to construct the whole shift lever 1 being rotatable about the base 2.

In FIG. 1, a not-shown indicator casing is arranged on the top of the base 2, representing respective range positions on a surface of the indicator casing. This indicator casing is provided, at an intermediate portion thereof, with a slide hole. With an operator's manipulation, the shift lever 1 is slidable in the slide hole formed in the indicator casing.

In the so-constructed shift lever device, it is necessary to assemble the shift lever 1 to the base 1 rotatably. Japanese Utility Model Application Laid-open No. 2584260 discloses a structure allowing such an assembling of the shift lever 1.

Figure 2:
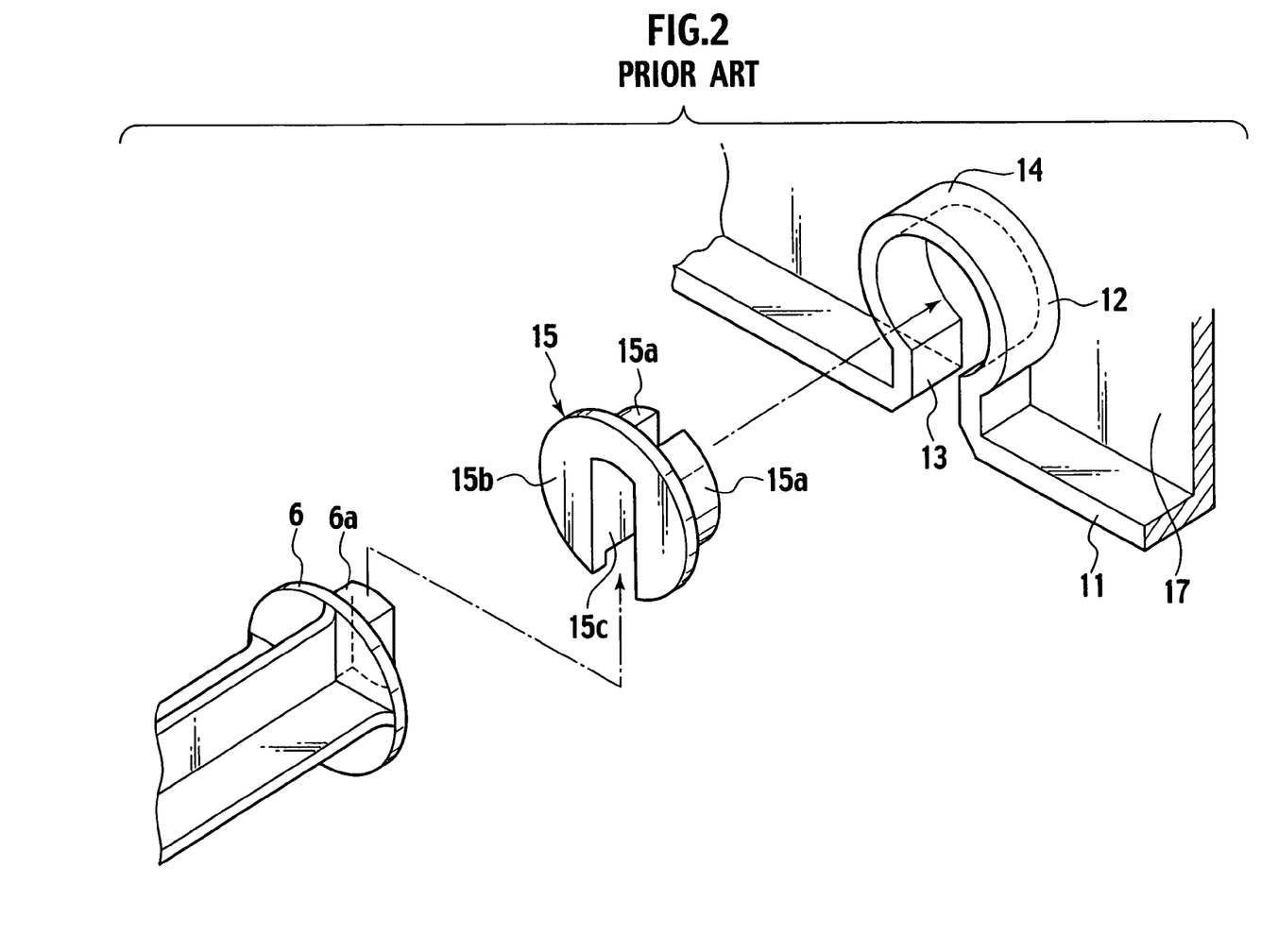
FIG. 2 is an exploded perspective view of the shift lever device in the related art.

FIGS. 1 and 2 show the above structure disclosed in Japanese Utility Model Application Laid-open No. 2584260. An opening 11 is formed on the bottom of the resinous base 2. Bearing parts 12 are formed on both sides of the opening 11. Each bearing part 12 is in the form of an annular body 14 provided, on a lower part thereof, with a recessed groove 13. The annular body 14 supports the shift lever 1 rotatably. On both sides of the opening 11 in the base 2, bearing parts 17 are formed so as to put the opening 11 therebetween, integrally.

The pivot shaft 6 is formed integrally with a lower end of the shift lever 1 so as to extend in a direction perpendicular to the longitudinal direction of the shift lever 1. The pivot shaft 6 is provided, on both sides thereof, with block parts 6a. Each of the block parts 6a is shaped to have a substantially-oval cross section obtained by cutting a circle by two parallel planes partially. By inserting the block parts 6a into the annular bodies 14 respectively, the pivot shaft 6, i.e. the shift lever 1 can be supported by the bearing parts 17. This supporting of the pivot shaft 6 is accomplished through the intermediary of bushes 15 (only one shown in the figure).

As shown in FIG. 2, the bush 15 comprises a cylindrical part 15a having the substantially-same diameter as that of the annular body 14 and a flange part 15b formed on one end of the body 15a integrally. Both of the cylindrical part 15a and the flange part 15b are formed with a common slit 15c having a width substantially equal to a width of the block part 6a.

In the above-mentioned structure, the bush 15 is inserted into the bearing part 12 so that the slit 15c of the bush 15 accords with the recessed groove 13 of the bearing part 12. Then, on condition of greatly inclining the shift lever 1 as shown with chain lines of FIG. 1, the block part 6a of the pivot shaft 6 is inserted into the slit 15c. Subsequently, as shown with solid lines of FIG. 1, the shift lever 1 is rotated to its upright direction and moved to a designated normal position. Since this rotation causes the block part 6a to move to a position apart from the recessed groove 13, the block part 6a is prevented from falling away the recessed groove 13 so long as the shift lever 1 is manipulated within a normal using range.

SUMMARY OF THE INVENTION

However, there are the following problems in the above-mentioned related arts.

In common with the above-mentioned related arts, since the opening is enlarged so as to allow the rotation of the shift lever in attaching, rigidity of the whole base is reduced that much.

Since the base is made of resinous material, it is easy to get warped. As a result, due to occurrence of such warpage, it is impossible to maintain its configuration with high accuracy.

Installation of the shift lever is difficult because of a large range of operation needed for installation. In order to solve the above-mentioned problems in the related arts, an object of the present invention is to provide a shift lever device having a base that does not require a large opening, exhibits sufficient rigidity to prevent occurrences of warpage, enables reservation of dimensional accuracy and allows a shift lever to be assembled with ease.

In order to attain the above object, according to the present invention, there is provided a shift lever device for a vehicle, including: a shift lever having a pivot shaft formed at a base end of the shift lever integrally, the pivot shaft extending along a direction intersecting with a longitudinal direction of the shift lever; a base having an opening formed to allow the shift lever to be inserted into the base and a pair of bearing parts formed so as to lie on opposing sides of the opening, each of the bearing parts having a bearing hole formed in the bearing part to adjoin the opening, and a guide groove formed in the bearing part to communicate with the bearing hole, for introducing the pivot shaft into the bearing hole; and a bearing bush which is to be inserted between the pivot shaft and the bearing hole, the bearing bush having a latch hook provided to engage with an interior of the bearing hole. In this shift lever device, since the bearing bush is fitted to the bearing hole on condition that the pivot shaft is being inserting into the bearing hole through the guide groove, the shift lever is rotatably supported by the base through the bearing bush.

According to the above aspect of the invention, by inserting the pivot shaft of the shift lever into the bearing holes through the guide grooves and fitting the bearing bushes to the bearing holes, the pivot shaft is rotatably supported by the bearing bushes rotatably. Consequently, it is possible to support the shift lever on the base rotatably, allowing the range position to be changed by the shift lever.

In the structure, since the bearing bushes are fitted to the bearing holes having the pivot shaft inserted through the guide grooves, the pivot shaft is prevented from falling away the bearing holes, allowing the shift lever to be rotatably supported by the bearing parts. Therefore, since there is no need to assemble the shift lever in its inclined condition, it eliminates the need for a large opening for inclining the shift lever to the base. Consequently, it is possible to increase rigidity of the base and also possible to make sure of appropriate dimensional accuracy with no possibility of an occurrence of warpage. Since the shift lever with no inclination is assembled into the base, the assembling operation can be accomplished with ease.

In the above-mentioned shift lever device, additionally, the base and the bearing bush may be provided with a anti-rotation mechanism for preventing the bearing bush from rotating by engaging with each other. Then, owing to the provision of the anti-rotation mechanism for locking up rotation of the bearing bush, the pivot shaft can be supported by the bearing bush certainly.

In the above aspect, further, the anti-rotation mechanism may comprise at least one locking projection formed on the bearing bush and at least one locking groove formed in the bearing hole for engagement with the locking projection.

In this case, due to the engagement between the locking projection and the locking groove, the pivot shaft can be supported by the bearing bush certainly.

Still further, at least either the pivot shaft or the base may be provided with a positioning mechanism for making an axial center of the pivot shaft coincide with a center of the bearing hole.

Then, since the positioning mechanism operates to make the axial center of the pivot shaft coincide with the center of the bearing hole, if only inserting the pivot shaft into the bearing hole, then it becomes possible to arrange the pivot shaft in position in the bearing hole. Thus, the pivot shaft can be fitted in the bearing part with ease and high accuracy.

Moreover, the positioning mechanism may include a positioning step which is formed on either an outer circumferential surface of the pivot shaft or a part of the base opposing the pivot shaft.

In this case, since the positioning step is formed on the outer circumferential surface of the pivot shaft or formed on the base's part opposing the pivot shaft, it is possible to provide the positioning mechanism in either the pivot shaft or the base easily.

These and other objects and features of the present invention will become more fully apparent from the following description and appended claims taken in conjunction with the accompany drawings.

DESCRIPTION OF THE PREFERRED EMBODIMENT

Referring to accompanying drawings, a first to fifth embodiments of the present invention will be described below. In the following description of the drawings, identical or similar elements are indicated with the same or similar reference numerals. Regarding the technical idea of the present invention, various changes and modifications may be made within the scope of claims.

$1^{st}$. Embodiment

Figure 3:
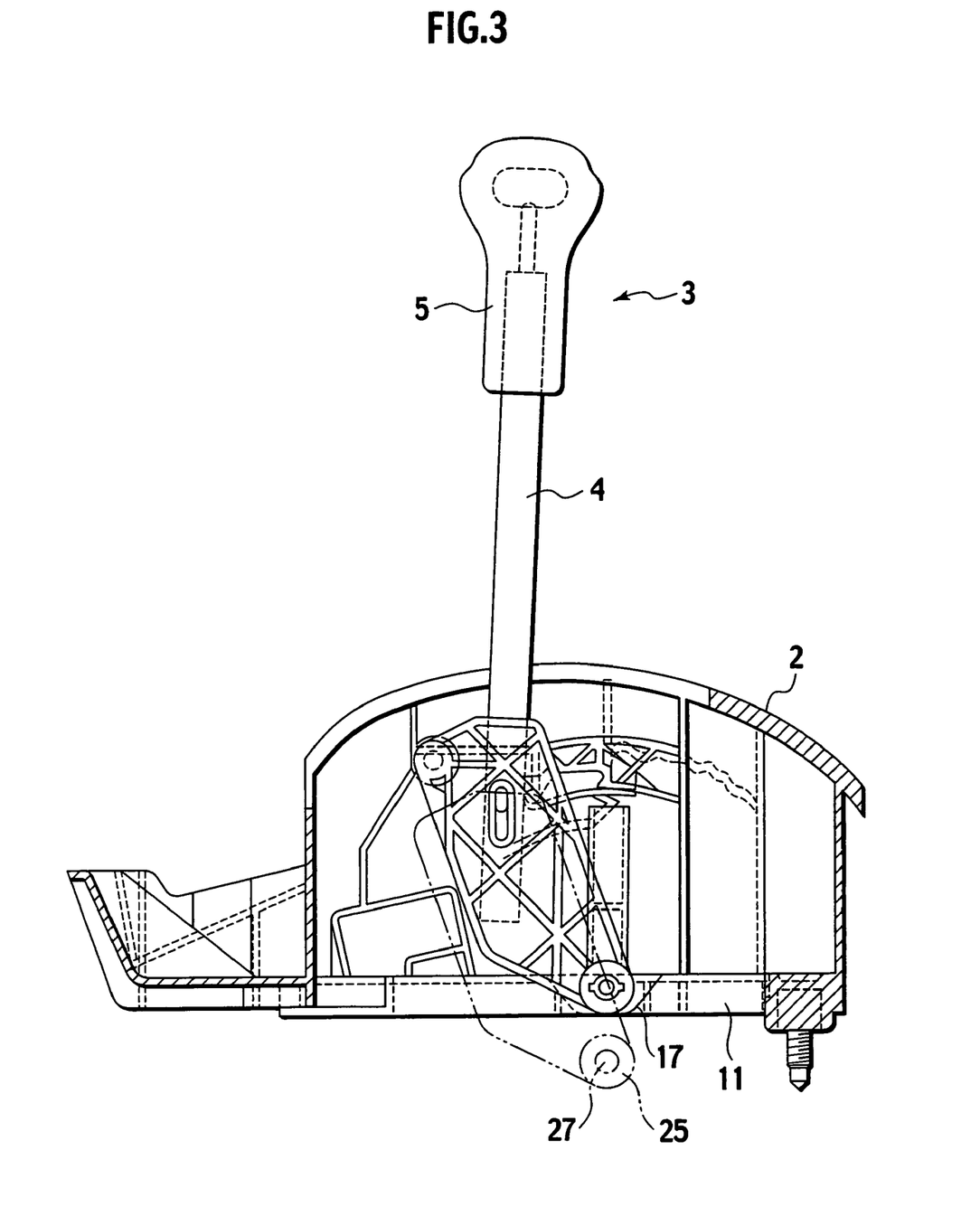
FIG. 3 is a sectional view of a shift lever device in accordance with a first embodiment of the present invention.
Figure 4:
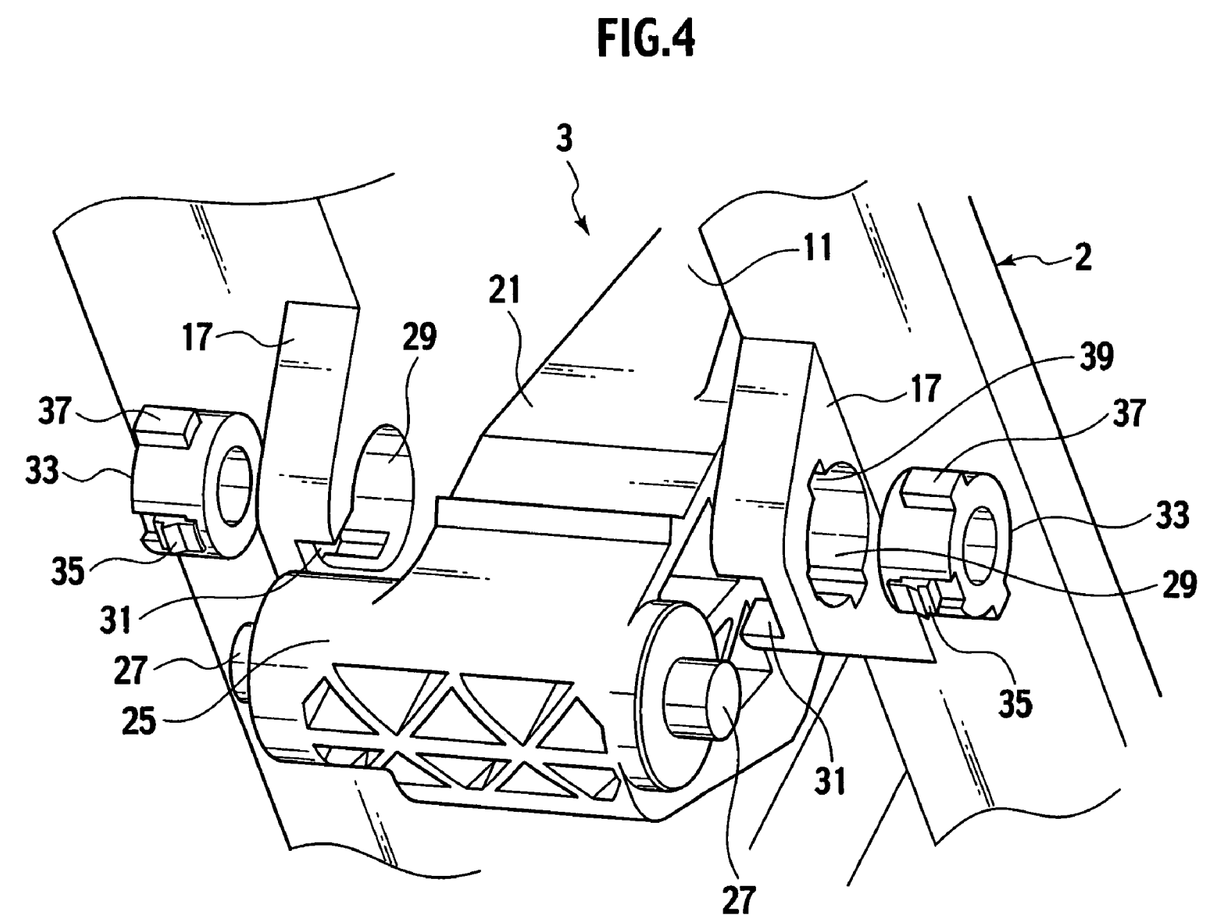
FIG. 4 is a perspective view showing an attaching procedure of a shift lever in accordance with the first embodiment of the present invention.
Figure 5:
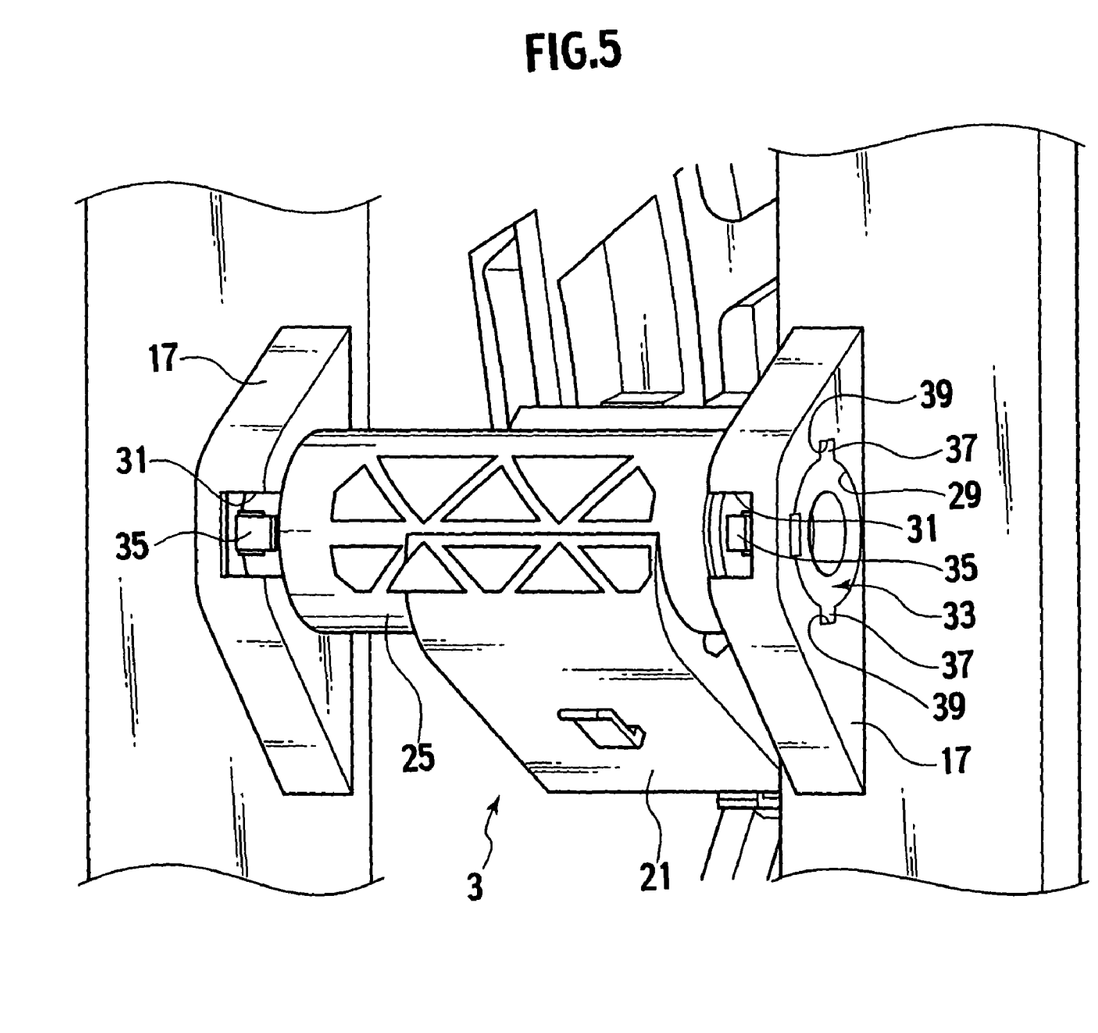
FIG. 5 is a perspective view showing a state where the shift lever of the first embodiment of the present invention is attached.
Figure 6:
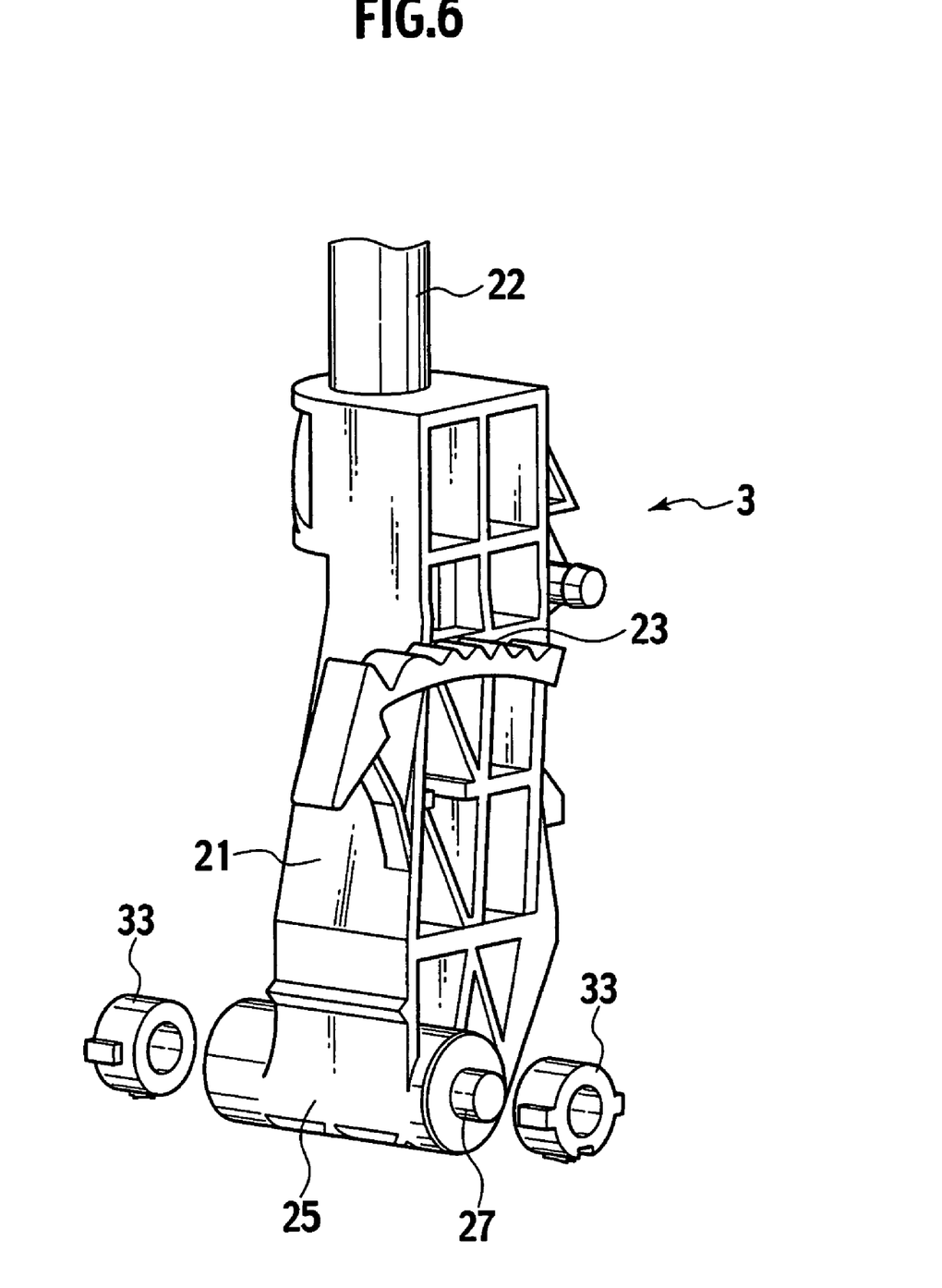
FIG. 6 is a perspective view showing a part of the shift lever of the first embodiment of the present invention.
Figure 7:
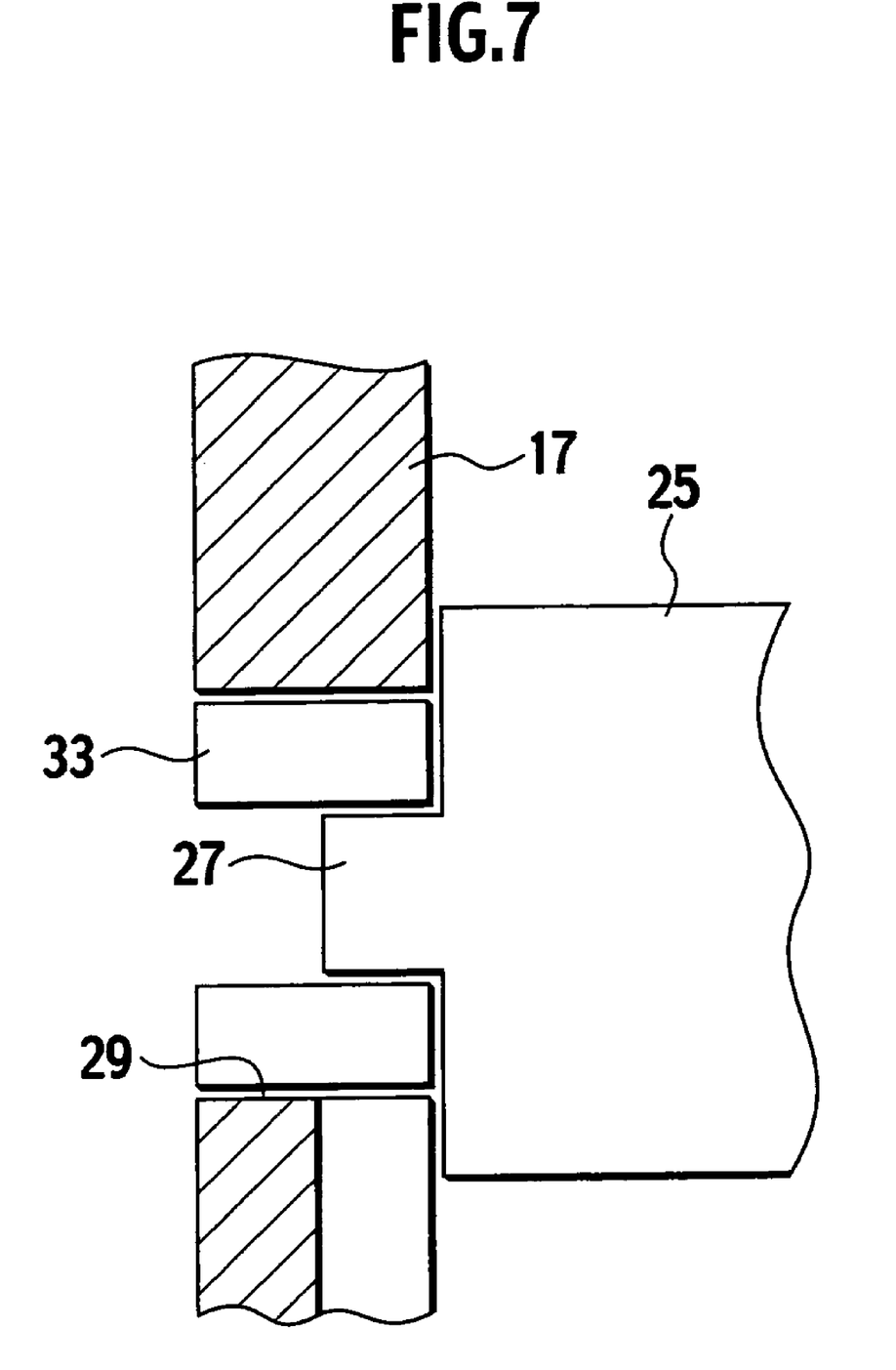
FIG. 7 is a sectional view showing a state where a bearing bush of the first embodiment of the present invention is inserted to support a pivot shaft.

The first embodiment of the present invention will be described with reference to the drawings. FIGS. 3 to 7 show the first embodiment of the invention. In the figures, FIG. 3 is a sectional view of a shift lever device in accordance with a first embodiment of the present invention. FIG. 4 is a perspective view of a shift lever from its downside, showing its attaching procedure. FIG. 5 is a perspective view showing a state where the shift lever is attached. FIG. 6 is a perspective view of the shift lever. FIG. 7 is a sectional view of an attaching condition. In the first embodiment, elements identical to those of FIGS. 1 and 2 are indicated with the same reference numerals, respectively.

As shown in FIG. 3, a base 2 is box-shaped and provided with an opening 11 into which a shift lever 3 is inserted. The shift lever 3 includes a rod part 4 rotatably supported on the base 2 and a resinous operating part 5 attached to on an upper end of the rod part 4. In assembling, the shift lever 3 is first inserted, through its leading end, into the opening 11 from the backside of the base 2. Then, the shift lever 3 is rotatably supported, through its base end, by the base 2. Upon establishment of the arrangement of the shift lever 3, its operating range position can be changed to any one of respective operating range positions: "P" (parking range) position; "R" (reverse range) position; "N" (neutral range) position; "D" (drive range) position; "2" (second range) position; and "L" (low range) position.

As shown in FIG. 6, the shift lever 3 includes a base part 21 having a block structure to enhance its rigidity and a rod part 22 extending from the base part 21 upwardly. In the shift lever 3, its operating part is formed by a tip of the rod part 22. The base part 21 is provided with a check mechanism 23 for imparting moderation feeling in changing the operating range position to an operator. At the lower end of the base part 21, a block shaft 25 is arranged so as to extend in a direction perpendicular to the longitudinal direction of the shift lever 3. On both left and right end faces of the block shaft 25, left and right pivot shafts 27, 27 are formed so as to extend integrally and coaxially with the block shaft 25. Thus, by extending in the same direction as the axial direction of the block shaft 25, the pivot shafts 27, 27 are adapted so as to extend in a direction perpendicular to the longitudinal direction of the shaft lever 3. The pivot shafts 27, 27 are formed with circular cross-sections. In the shift lever 3 constructed above, the pivot shafts 27, 27, the block shaft 25 and the base part 21 are all made of resinous material.

On both sides of the opening part 11 in the base 2, respective bearing parts 17, 17 in pairs are formed so as to interpose the opening part 11, integrally with the base 2. Including the bearing parts 17, 17, the base 2 is made of resinous material, as a whole. The bearing part 17, 17 support the pivot shafts 27, 27 of the shift lever 3 rotatably. In other words, due to the supporting of the bearing parts 17, 17, the shift lever 3 can be supported by the base 2 rotatably.

For this rotatable supporting against each pivot shaft 27, the bearing part 17 is formed with a circular bearing hole 29 into which the pivot shaft 27 is inserted. In the bearing part 17, additionally, a guide groove 31 is formed in communication with the bearing hole 29. The guide groove 31 comprises a recessed groove extending from the bearing hole 29 downwardly. When the pivot shaft 27 is inserted from a downside of the bearing part 17, the guide groove 31 operates to introduce the pivot shaft 27 into the bearing hole 29.

According to the first embodiment, there are provided a pair of bearing bushes 33, 33 for holding the pivot shafts 27, 27. The bearing bushes 33, 33 are made of resinous material and also shaped to be substantially cylindrical. On condition that the pivot shafts 27, 27 are inserted into the bearing holes 29, 29 respectively, the bearing bushes 33, 33 are inserted into the bearing holes 29, 29 from the outside. Owing to the insertion, each of the bearing bushes 33 is interposed between the pivot shaft 27 and the bearing hole 29 to play a role of bearing the pivot shaft 27.

Each bearing bush 33 has a latch hook 35 and a pair of locking projections 37, 37 (as an anti-rotation mechanism) formed on the outer circumferential surface. In operation, when the latch hook 35 engages in the guide groove 31 as shown in FIG. 5, an engagement of the bearing bush 33 with the base 2 is accomplished. Thus, the latch hook 35 serves to prevent the bearing bush 33 from falling away the base 2.

On the outer circumferential surface of the bearing bush 33, the locking projections 37, 37 are arranged in different positions from the latch hook 35. Corresponding to the locking projections 37, 37, the bearing hole 29 is provided with locking grooves 39, 39. With engagement of the locking projections 37, 37 with the locking grooves 39, 39, free rotation of the bearing bush 33 in the bearing hole 29 is locked up. As a result, the bearing bush 33 enables the pivot shaft 27 to be held certainly. Note that if the above-mentioned latch hook 35 is formed so as to double as an anti-rotation element for the bearing bush 33, it would eliminate the need for providing the locking projections 37, 37 and the locking grooves 39, 39.

When assembling the shift lever 3 in the base 2 in accordance with the first embodiment, the shift lever 3 in an upright posture is inserted into the opening 11 from the underside of the base 2, as shown with chain lines of FIG. 3. Then, the shift lever 3 is moved to a predetermined normal position, as shown with solid lines of FIG. 3. This operation is carried out in a manner that the pivot shafts 27, 27 pass through the guide grooves 31, 31 and get into the bearing holes 29, 29 respectively. More in detail, each of the pivot shafts 27, 27 is inserted into the bearing hole 29 while defining a space that allows an insertion of the bearing bush 33, between the pivot shaft 27 and the bearing hole 29. In this state, the bearing bush 33 is inserted into the bearing hole 29 from the outside. At this time, the bearing bush 33 is inserted into the bearing hole 29 so as to occupy the above space defined in the bearing hole 29. With the insertion of the bearing bush 33, the latch hook 35 and the locking projections 37, 37 engage in the guide groove 31 and the locking grooves 39 respectively, so that bearing bush 33 is fixed in the bearing hole 29 while supporting the pivot shaft 27 rotatably (see FIGS. 5 and 7). In this way, the shift lever 3 can be supported by the base 2 rotatably. The resinous operating part 5 is attached to on an upper end of the rod part 4 after the shift lever 3 has been moved to a predetermined normal position.

According to the first embodiment of the present invention, by first installing the shift lever 3 in the base 2 so that the pivot shafts 27, 27 are inserted into the bearing holes 29, 29 and subsequently inserting the bearing bushes 33 into the bearing holes 29, 29, it is possible to allow the base 2 to support the shift lever 3 while preventing it from falling off the base 2. Accordingly, there is no need of inclined assembling of the shift lever 3, eliminating the need for enlarging the opening 11 in view of inclining the shift lever 3 to the base 2. Consequently, it is possible to make the rigidity of the base 2 larger and also possible to maintain its configuration with high accuracy due to no occurrence of warpage.

Repeatedly, an operator in assembling has only to insert the shift lever 3 as it is into the opening 11 of the base 2 since there is no need for the operator to either incline the shift lever 3 or rotate it from its inclined posture to the upright posture. Therefore, the operator can perform the assembling operation of the shift lever 3 with ease.

$2^{nd}$ Embodiment

Figure 8:
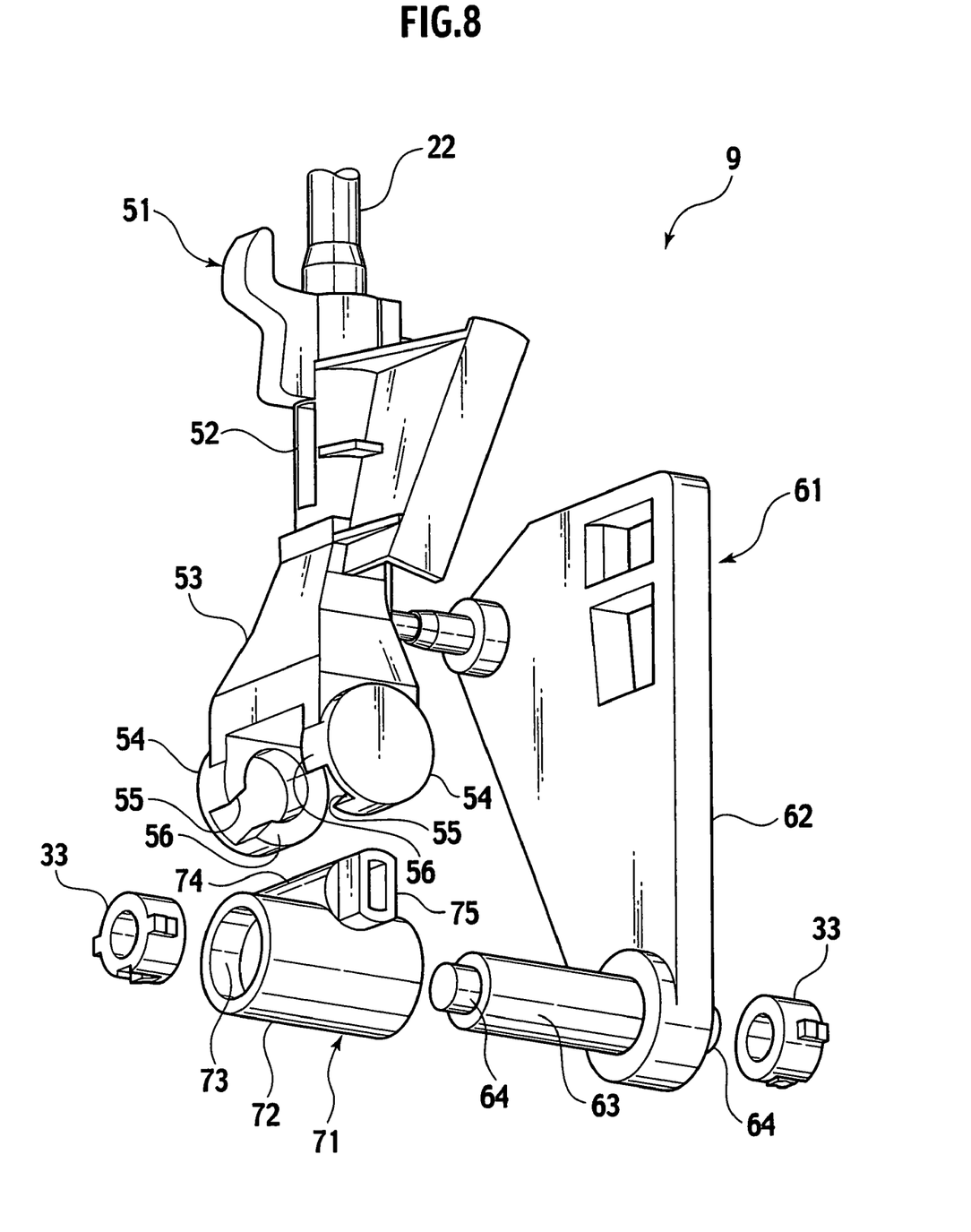
FIG. 8 is a perspective view of a shift lever in accordance with a second embodiment of the present invention.

Next, the second embodiment of the present invention will be described in detail. FIG. 8 is an enlarged perspective view of a substantial part of a shift lever. In the second embodiment, elements identical to those of the first embodiment are indicated with the same reference numerals respectively. In the first embodiment, the present invention is applied to the shift lever device where the shift lever 3 is pivotally supported so as to allow a selecting of respective operating ranges arranged along a fore-and-aft direction of the vehicle body: "P" (parking range) position; "R" (reverse range) position; "N" (neutral range) position; "D" (drive range) position; "2" (second range) position; and "L" (low range) position. While, a shift lever 9 is accordance with the second embodiment is applied to a shift lever device capable of swinging in both fore-and-aft and left-and-right directions of a vehicle, for example, a so-called "gate-type" shift lever device where the shift lever is manipulated in zigzags, a shift lever device with a manual mode, etc.

The second embodiment of the invention relates to the shift lever device with a manual mode. The shift lever 9 includes a select lever 61 and a crosswise shift lever 51. Being carried by the base 2, the select lever 61 is capable of swinging in the fore-and-aft direction of the vehicle body, about a lengthwise pivot shaft 63 as fulcrum. While, the crosswise select lever 51 is carried by the select lever 61 and capable of swinging in the left-and-right direction of the vehicle body, about a crosswise pivot shaft 74 as fulcrum. If a driver (or operator) manipulates the above operating part in the fore-and-aft direction of the vehicle body, then the crosswise shift lever 51 swings in integral with the select lever 61. While, if the driver manipulates the rod part 22 in the left-and-right direction of the vehicle body, only the crosswise shift lever 51 swings. In this way, by manipulating the rod part 22 in both fore-and-aft direction and left-and-right direction of the vehicle body in combination, an operator allows the shift lever 9 to move to any one of the manual-mode operating position and six range positions: "P" (parking range) position; "R" (reverse range) position; "N" (neutral range) position; "D" (drive range) position; "2" (second range) position; and "L" (low range) position.

The crosswise shift lever 51 is mainly formed by a base part 52 and the rod part 22. The base part 52 is carried by the select lever 61 and capable of swinging in the left-and-right direction of the vehicle body, about the crosswise pivot shaft 74 as fulcrum. The rod part 22 is formed so as to extend from the base part 52 upwardly and integrally. Similarly, the rod part 22 is equipped, at a tip thereof, with the operating part. A two-pronged part 53 is formed at the bottom of the base part 52. The two-pronged part 53 is provided with two bearing parts 54, 54. Each bearing part 54 is formed by an annular body 56. The annular body 56 is provided, at its lower part, with a recessed groove 55. The annular body 56 is adapted so as to support the crosswise pivot shaft 74 of an axle body 71 rotatably.

The select lever 61 includes a plate-shaped lever body 62 and the lengthwise pivot shaft 63 extending from the plate-shaped lever body 62. The lengthwise pivot shaft 63 is in the form of a column. The lengthwise pivot shaft 63 is formed so as to extend at the lower end of the lever body 62 along the left-and-right direction of the vehicle body and penetrate the lever body 62. The lengthwise pivot shaft 63 is provided, on both ends thereof, with lengthwise supports 64, 64.

The axle body 71 comprises a cylindrical main body 72 having a through-hole 73 formed therein and the crosswise pivot shaft 74 formed integrally with the main body 72 to extend in a direction perpendicular to the through-hole 73. The crosswise pivot shaft 74 is provided, on both ends thereof, with crosswise supports 75, 75. Each of the crosswise supports 75, 75 is shaped to have a substantially-oval cross section obtained by cutting a circle by two parallel planes partially. By inserting the crosswise supports 75, 75 into the annular bodies 56 respectively, the two-pronged part 53, i.e. the crosswise shift lever 51 can be rotatably supported in the left-and-right direction of the vehicle body. The lengthwise pivot shaft 63 of the select lever 61 penetrates the through-hole 73, so that the crosswise shift lever 51 is rotatably supported in the fore-and-aft direction of the vehicle body, together with the axle body 71.

In advance of assembling the so-constructed shift lever 9 of the second embodiment into the base 2, it is first carried out to assemble the shift lever 9. That is, on condition of inclining the crosswise shift lever 51 greatly so that the crosswise supports 75, 75 accord with the recessed grooves 55, 55 of the bearing parts 54, 54, in other words, inclining the crosswise shift lever 51 greatly over its pivotal range in the left-and-right direction on completion of assembling the shift lever device, the crosswise supports 75, 75 of the crosswise pivot shaft 74 are inserted into the recessed grooves 55 from the underside of the base part 52. Subsequently, the crosswise shift lever 51 is rotated to its upright posture, i.e. a designated normal position along the select lever 61. Since this rotation allows each crosswise support 75 to move to a position apart from the recessed groove 55, there is no possibility that the crosswise support 75 falls away the recessed groove 55 so long as the shift lever 9 is operated within its normal usable range.

Next, as similar to the first embodiment (see FIG. 4 about the base 2), the shift lever 9 in the substantially-upright posture is inserted into the opening 11 from the downside of the base 2. Then, on condition of respectively inserting the lengthwise supports 64, 64 into the bearing holes 29, 29 through the guide grooves 31, 31 of the base 2, the bearing bushes 33, 33 are inserted into the bearing holes 29, 29 from the outside, so that the shift lever 9 is assembled into the base 2.

Although it would be possible to make the supporting structure of the select lever 61 against the crosswise shift lever 51 similar to that of the base 2 against the select lever 61, it is possible to reduce the number of components and manufacturing cost in accordance with the second embodiment.

FIGS. 9 to 14 show a third to fifth embodiments of the invention where a positioning mechanism is provided to the first embodiment or the second embodiment.

$3^{rd}$. Embodiment

Figure 9:
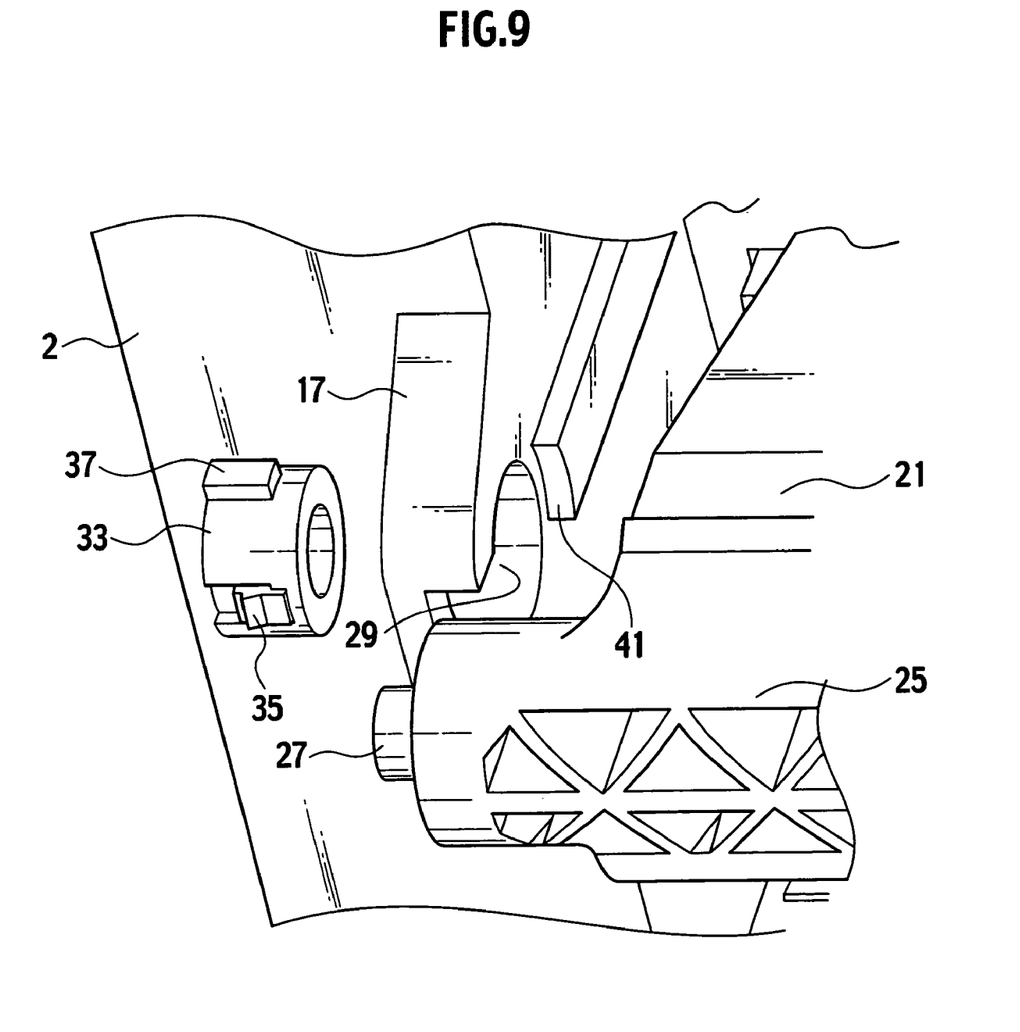
FIG. 9 is a perspective view including a positioning mechanism in accordance with a third embodiment of the present invention.
Figure 10:
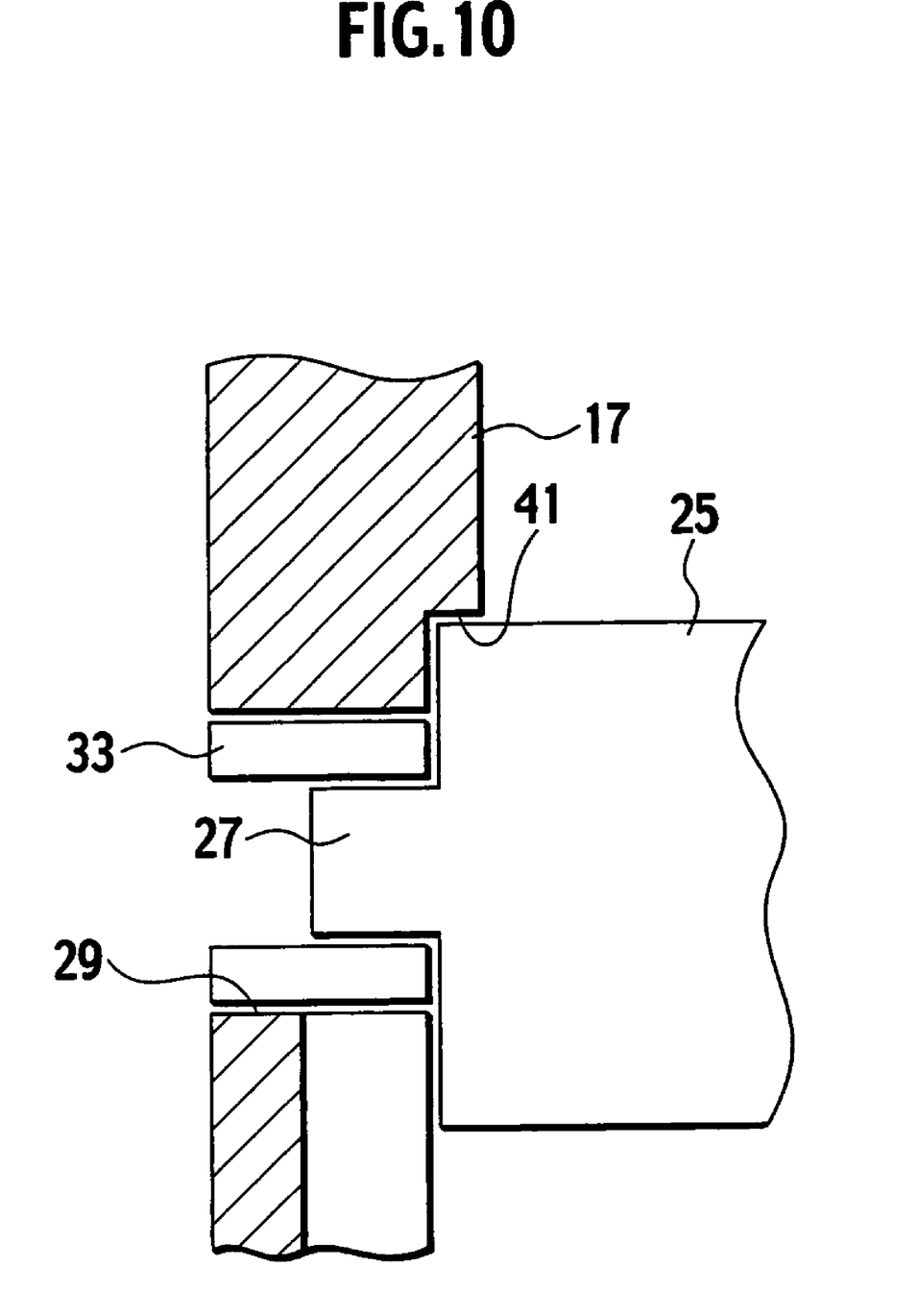
FIG. 10 is a sectional view including a positioning step in accordance with the third embodiment of the present invention.

According to the third embodiment of FIGS. 9 and 10, the bearing part 17 is provided, on its surface opposing the opening 11, with a positioning step 41 forming the above positioning mechanism. In detail, on the peripheral side of the bearing hole 29, the positioning step 41 is formed in a position opposing the bearing hole 29. The positioning step 41 is provided in order to bring an axial center of the pivot shaft 27 into line with a center of the bearing hole 29.

According to the third embodiment, when inserting the pivot shaft 27 into the bearing hole 29 in accordance with a procedure similar to the first or second embodiment, the outer circumferential surface of the block shaft 25 abuts on the positioning step 41 on the bearing part 17, as shown in FIG. 10. With this abutment, the axial center of the pivot shaft 27 coincides with the center of the bearing hole 29 automatically. Therefore, by subsequently inserting the bearing bush 33 into the bearing hole 29, it is possible to allow the shift lever 3 to be supported by the base 2 rotatably.

$4^{th}$. Embodiment

Figure 11:
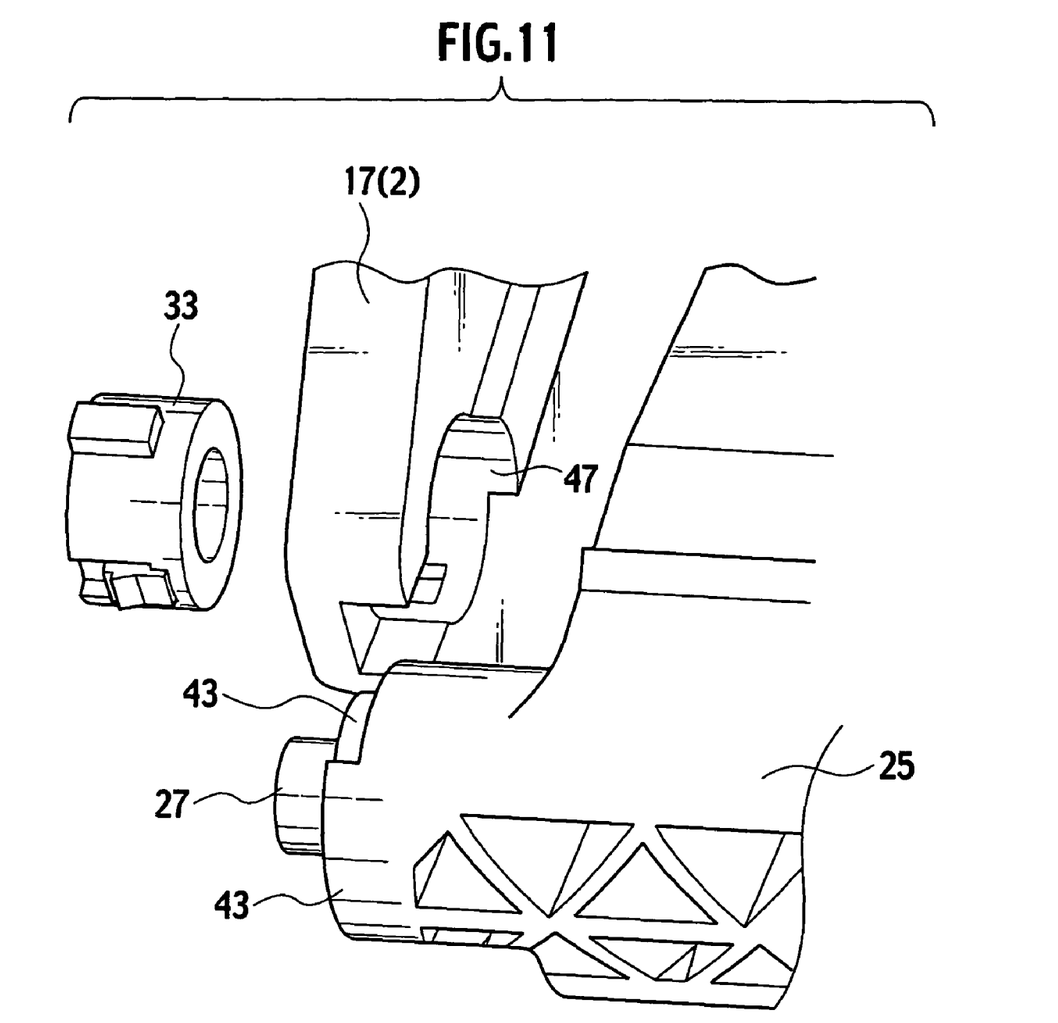
FIG. 11 is a perspective view including a positioning mechanism in accordance with a fourth embodiment of the present invention.
Figure 12:
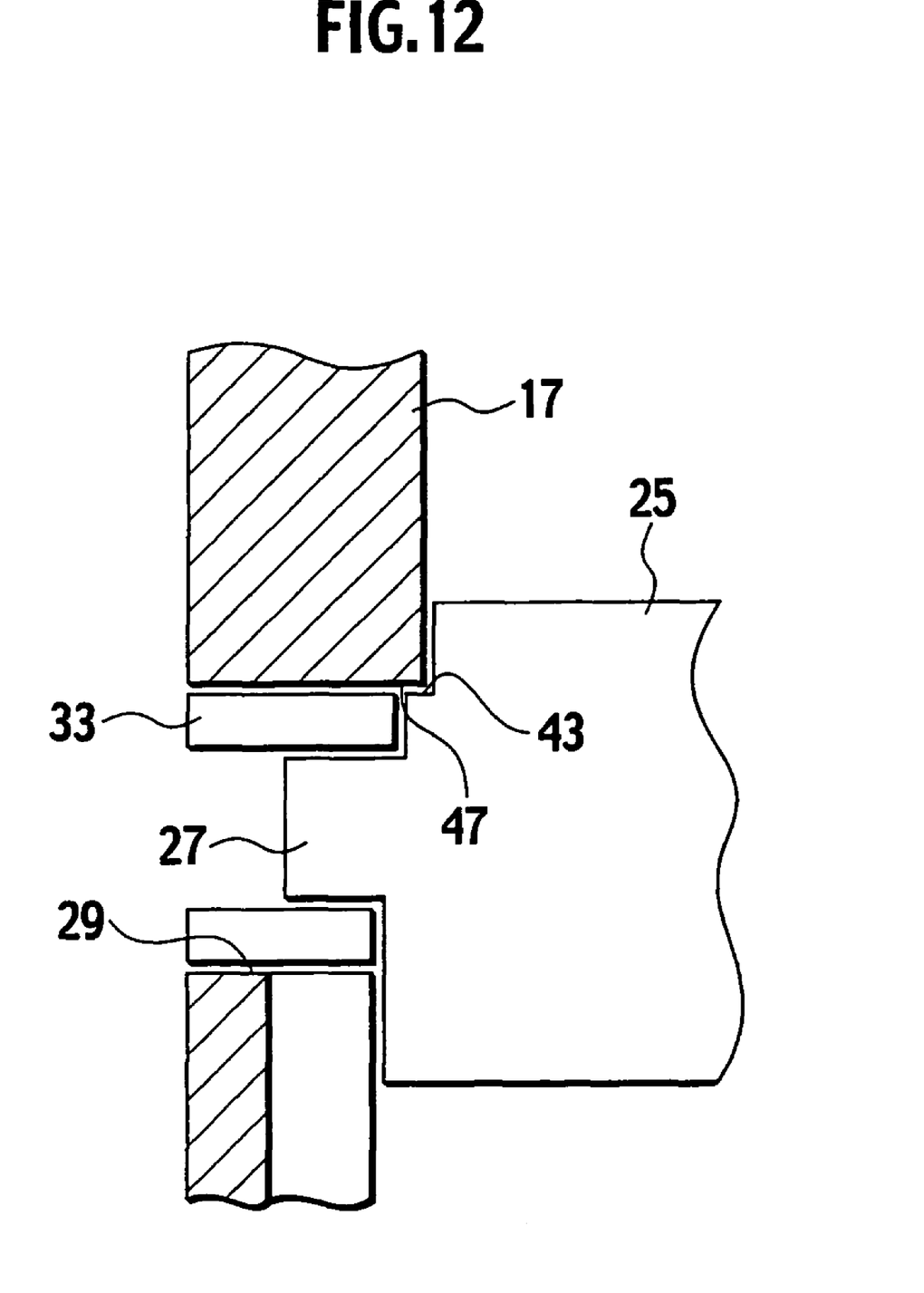
FIG. 12 is a sectional view including a positioning step in accordance with the fourth embodiment of the present invention.

In the fourth embodiment of the invention shown in FIGS. 11 and 12, the shift lever 3 has a positioning step 43 formed in a part of the block shaft 25 to constitute the above positioning mechanism. The positioning step 43 is formed on the outer circumferential surface of the shaft 25 corresponding to a boundary between the pivot shaft 27 and the block shaft 25. That is, the positioning step 43 is positioned in a part of the outer circumferential surface of the block shaft 25, for example, in a half-round part of the shaft 25. The positioning step 43 is formed with a height that is established so as to make the axial center of the pivot shaft 27 coincide with the center of the bearing hole 29.

According to the fourth embodiment, when inserting the pivot shaft 27 into the bearing hole 29, the positioning step 43 abuts on an inner surface 47 as a result of extending the bearing hole 29, as shown in FIG. 12. With this abutment, the axial center of the pivot shaft 27 coincides with the center of the bearing hole 29 automatically. Therefore, by subsequently inserting the bearing bush 33 into the bearing hole 29, it is possible to allow the shift lever 3 to be rotatably supported by the base 2 through the intermediary of the bearing bush 33.

$5^{th}$. Embodiment

Figure 13:
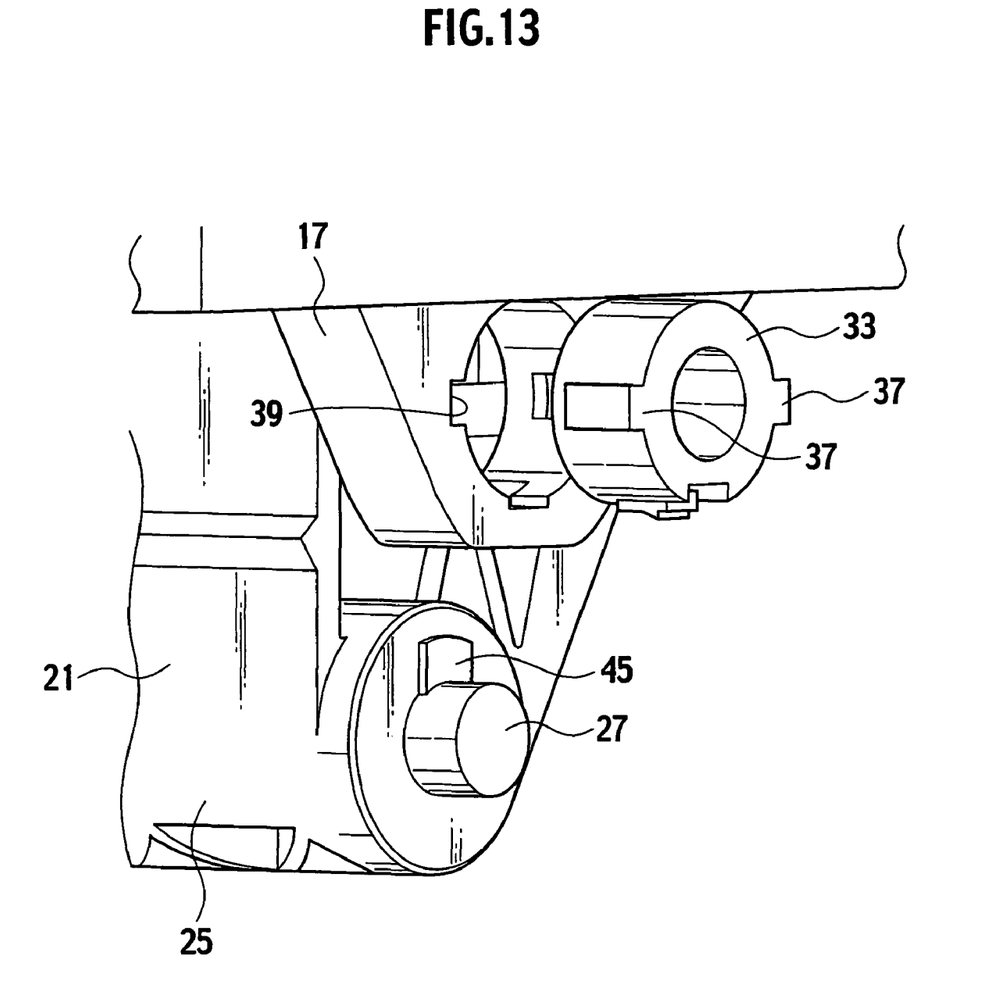
FIG. 13 is a perspective view including a positioning mechanism in accordance with a fifth embodiment of the present invention.
Figure 14:
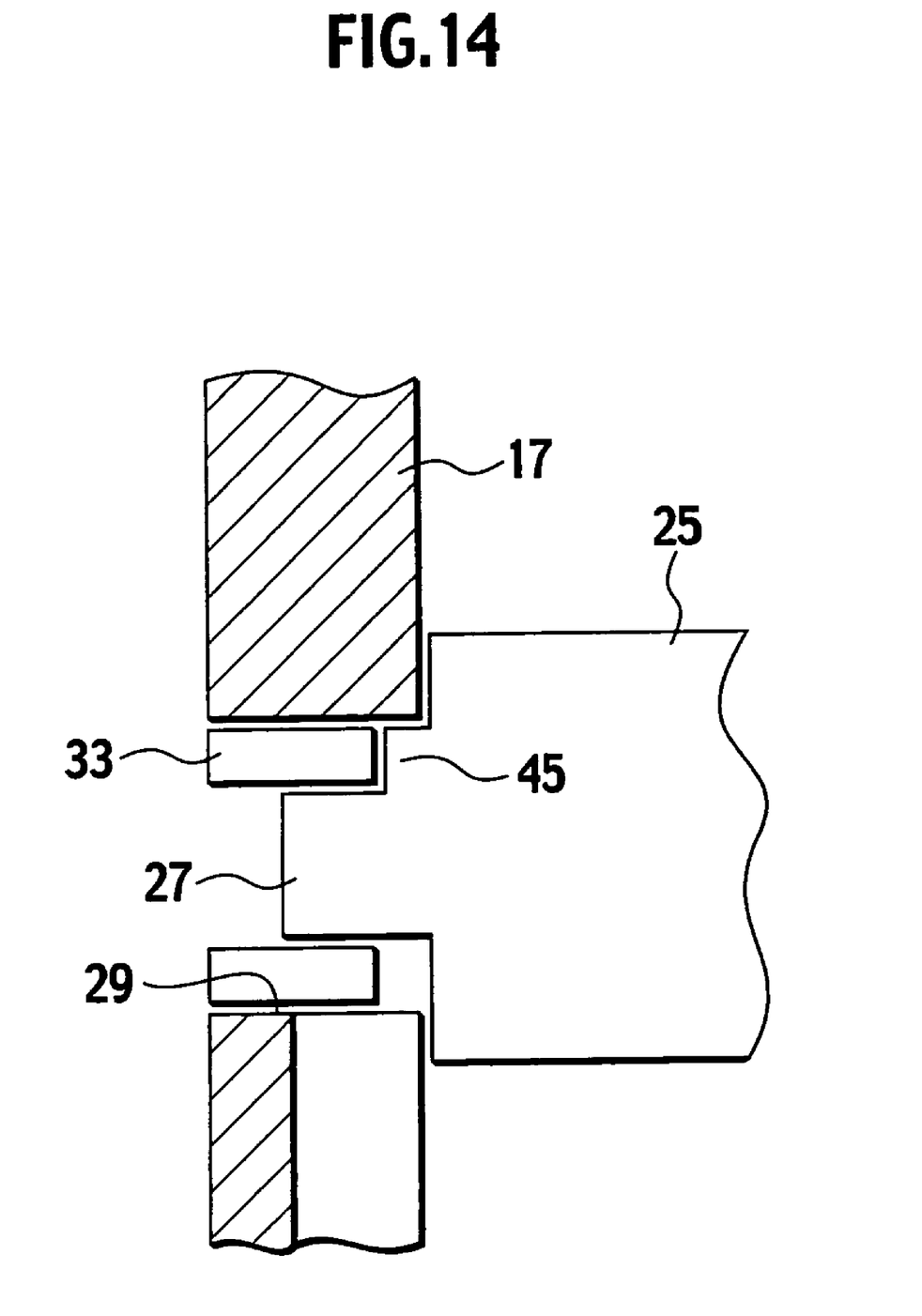
FIG. 14 is a sectional view including a positioning step in accordance with the fifth embodiment of the present invention.

In the fifth embodiment of the invention shown in FIGS. 13 and 14, the block shaft 25 is provided, on an end surface thereof, with a positioning step 45 forming the above positioning mechanism. The positioning step 45 is formed so as to extend from a root of the pivot shaft 27 in a diametrical direction, constituting a part of the pivot shaft 27. The positioning step 45 operates to make the axial center of the pivot shaft 27 coincide with the center of the bearing hole 29. In the positioning step 45, its outer surface is shaped in an arc to abut on an inner surface of the bearing hole 29.

According to the fifth embodiment, when inserting the pivot shaft 27 into the bearing hole 29, the positioning step 43 abuts on the inner surface of the bearing hole 29, as shown in FIG. 14. With this abutment, the axial center of the pivot shaft 27 coincides with the center of the bearing hole 29 automatically. Therefore, by subsequently inserting the bearing bush 33 into the bearing hole 29, it is possible to allow the shift lever 3 to be rotatably supported by the base 2 through the intermediary of the bearing bush 33.

In common with the third to fifth embodiments of FIGS. 9 to 14, if only inserting the pivot shaft 27 of the shift lever 3 into the bearing hole 29, it becomes possible to position the pivot shaft 27 in relation to the bearing hole 29. Thus, it is possible to assemble the pivot shaft 27 in the bearing part 17 with ease and high accuracy. Additionally, owing to their configurations, it is possible to provide the bearing part 17 (or the block shaft 25) with the positioning steps 41, 43, 45 easily.

In various modifications related to the third to fifth embodiments, the positioning steps 41, 43, 45 may be formed on the other member to be mated with either the bearing part 17 or the block shaft 25. Alternatively, the positioning steps 41 (43, 45) may be composed of a plurality of positioning elements and further allocated to both of the bearing part 17 and the block shaft 25. Additionally, the shift lever device of the invention may be otherwise constructed in a manner that the shift lever 3 (9) is inserted into the opening 11 from the upside of the base 2. Then, it is possible to arrange the positioning steps 41, 43, 45 on the opposite side (e.g. lower side in FIG. 9) of their respective positions in the above-mentioned embodiments with respect to either the axial center of the pivot shaft 27 or the bearing hole 20.

Although the present invention have been described by the first to fifth embodiments, the present invention is not limited to this, and configurations of the respective elements can be replaced by arbitrary configurations having similar functions.

What is claimed is:

1. A shift lever device for a vehicle, comprising:
    a shift lever having a pivot shaft formed at a base end of the shift lever integrally, the pivot shaft extending along a direction intersecting with a longitudinal direction of the shift lever;
    a base having an opening formed to allow the shift lever to be inserted into the base and a pair of bearing parts formed so as to lie on opposing sides of the opening, each of the bearing parts having
    a bearing hole formed in the bearing part to adjoin the opening, and
    a guide groove formed in the bearing part to communicate with the bearing hole, for introducing the pivot shaft into the bearing hole, wherein the guide groove partially extends through a width of the bearing part; and
    a bearing bush disposed between the pivot shaft and the bearing hole, the bearing bush having a latch hook provided to engage with an interior of the bearing hole, the bearing bush having a cylindrical shaft hole for supporting the pivot shaft rotatably therein, wherein
    the pivot shaft is introduced into the bearing hole only through the guide groove so that the pivot shaft is disposed in the bearing hole,
    the bearing bush is introduced into the bearing hole only from an axial direction of the bearing hole,
    the pivot shaft is introduced into the shaft hole only from an axial direction of the shaft hole, and
    the shift lever is rotatably supported by the base through the bearing bush.

2. The shift lever device of claim 1, wherein the base and the bearing bush are provided with an anti-rotation mechanism comprising at least one locking projection formed on the bearing bush and at least one locking groove formed in the bearing hole to engage with the locking projection, for preventing the bearing bush from rotating by engagement of the locking projection and the locking groove.

3. The shift lever device of claim 1 further comprising a positioning step which is formed on either an outer circumferential surface of the pivot shaft or a part of the base opposing the pivot shaft for making an axial center of the pivot shaft coincide with a center of the bearing hole.

4. A shift lever device for a vehicle, comprising:
    a shift lever having a pivot shaft formed at a base end of the shift lever integrally, the pivot shaft extending along a direction intersecting with a longitudinal direction of the shift lever;
    a base having an opening formed to allow the shift lever to be inserted into the base and a pair of bearing parts formed so as to lie on opposing sides of the opening, each of the bearing parts having
    a bearing hole formed in the bearing part to adjoin the opening, and
    a guide groove formed in the bearing part to communicate with the bearing hole, for introducing the pivot shaft into the bearing hole;
    a bearing bush disposed between the pivot shaft and the bearing hole, the bearing bush having a latch hook provided to engage with an interior of the bearing hole, the bearing bush having a cylindrical shaft hole for supporting the pivot shaft rotatably therein,
    wherein
    the pivot shaft is introduced into the bearing hole only through the guide groove so that the pivot shaft is disposed in the bearing hole,
    the bearing bush is introduced into the bearing hole only from an axial direction of the bearing hole, and
    the pivot shaft is introduced into the shaft hole only from an axial direction of the shaft hole,
    the shift lever is rotatably supported by the base through the bearing bush; and
    a positioning step formed on either an outer circumferential surface of the pivot shaft or a part of the base opposing the pivot shaft for making an axial center of the pivot shaft coincide with a center of the bearing hole.

* * * * *